J. A. LAMPHIER.
Improvement in Horse Powers.
No. 122,896.
Patented Jan. 23, 1872.
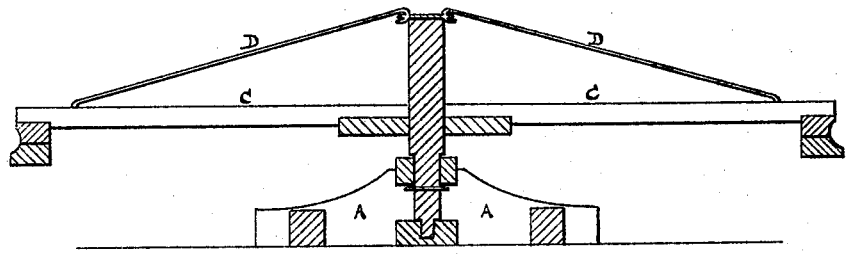
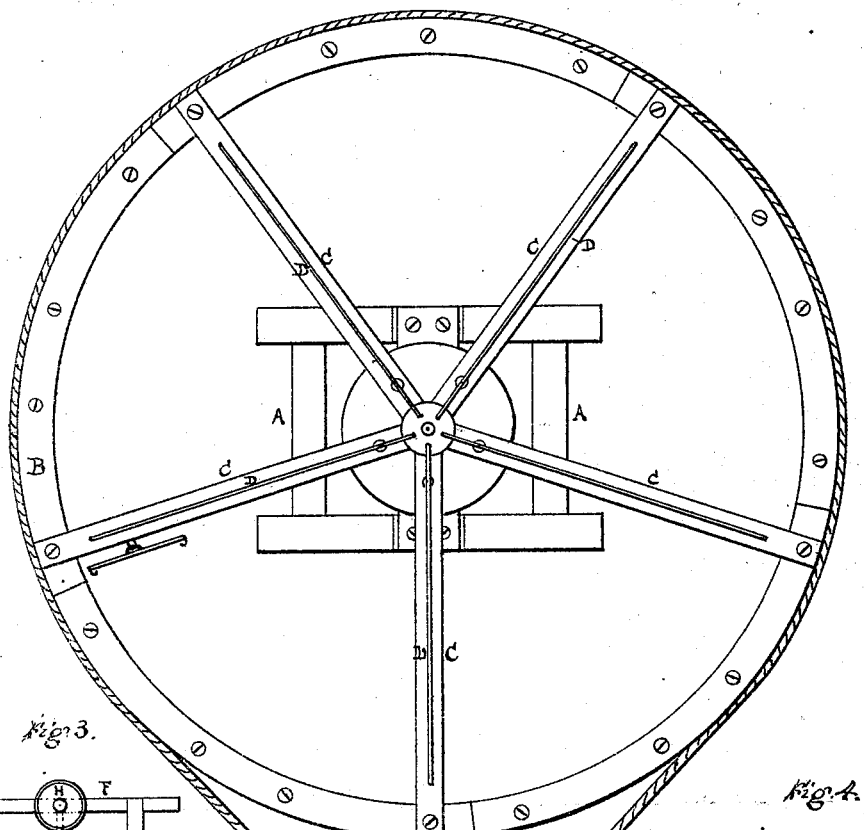
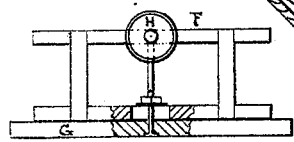
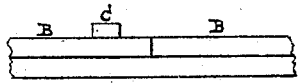
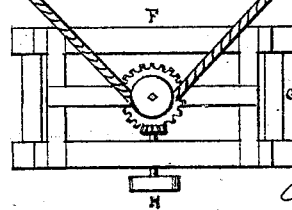
Witnesses.
John L. Lewis
Charles Hatchum
Inventor.
John A. Lamphier

UNITED STATES PATENT OFFICE.

JOHN A. LAMPHIER, OF DRESDEN, NEW YORK, ASSIGNOR TO HIMSELF, LUZENE VAN DEVENTER, AND JACOB VAN DEVENTER, OF SAME PLACE.

IMPROVEMENT IN HORSE-POWERS.

Specification forming part of Letters Patent No. 122,896, dated January 23, 1872.

I, JOHN A. LAMPHIER, of Dresden, in the county of Yates and State of New York, have invented certain Improvements in Horse-Powers, of which the following is a specification:

The first part of my invention relates to the construction of a horse-power with an annular rim that is grooved on the periphery so as to hold a rope, chain, or belt, with arms and supporting-braces extending inward to a supporting-spindle; and the spindle is supported by journal-boxes in a frame-work that sets on the ground, and made so as to be held securely by means of stakes driven into the ground. The rim is made in sections to be taken apart for transportation and allow the horses to be put inside of the rim to work. The second part relates to the construction of a jack that will receive the power of the horses when transmitted to it by a rope or belt and impart the same to any machine that may be driven by horses; also to making the jack so that the rope or belt may be tightened without unfastening it from the ground.

Figure 1 is a vertical section of the horse-power; Fig. 2, a top view of the power and jack combined; Fig. 3, a side view of the jack; and Fig. 4 is a section of the main wheel.

A is a wooden frame-work. A top view of it is represented in Fig. 2. It is made to receive and support the center spindle and allow it to turn freely. It must be made so that it may be held firmly to the ground by means of stakes, but will not require staking as securely as the ordinary horse-power. B is the rim of the main wheel; it is made in sections, as represented in Fig. 4, and held together with bolts or screws, so that it may be readily taken apart for transportation and allow the horses to pass to the inside of the rim and be readily put together when it is to be used. The periphery has a groove to receive the rope, chain, or belt; the groove may be made to suit either. The number of sections must correspond with the number of arms to the wheel, so that the sections may all be made alike. The rim should be made a perfect circle, so that the belt will transmit the power of the horses uniformly to the jack. C is one of a series of radial arms that holds the rim B in position; they are represented in Figs. 1 and 2, and the end of one in Fig. 4. Any number of arms may be used, according to the size of wheel required. The inner end is bolted to a collar on the center spindle, as shown in Figs. 1 and 2. The outer ends are placed on the top of the rim B and held by bolts or screws, so that they may be readily taken off for transportation. D is one of a series of brace-rods; they are fastened to the collar on the top of the spindle, and the other ends to the arms C, as shown in Figs. 1 and 2; their use is to hold the rim in proper position. E is a rope or belt that transmits the power of the horses to the jack; its position is shown in Fig. 2. F is the jack. It may be made of any kind of frame-work that will hold the pivots of the various kinds of wheels that may be used. It may be made of wood or iron, and must be provided with the foundation G, as represented in Fig. 3, so that the belt may be tightened at will without loosening the jack from the ground. The jack may be placed at any point around the main wheel and changed to another position when circumstances require it. G is the foundation of the jack. It is a rectangular frame of wood or iron. It must be made so that it can be held firmly to the ground with stakes or other device. Its side pieces should correspond with the other side pieces of the jack, so that, with a bolt in each side piece, as shown in Fig. 3, the jack may be held to it; and by means of a mortise in the side pieces of the jack the jack may be moved when tightening the belt. H is a band-wheel that is used to transmit the power to any kind of machinery to which this kind of power may be applied. When preferable, this band-wheel may be removed and a shaft or other device may be used in its stead.

I claim as my invention—

1. The main wheel, when made with the rim B, arms C, and braces D, when constructed, arranged, and supported substantially as and used for the purpose set forth.

2. Also, the jack E, when made with the foundation G, and constructed to operate and be used substantially as specified.

JOHN A. LAMPHIER.

Witnesses:
JOHN L. LEWIS,
CHARLES KETCHUM.